F. R. TENGLER.
HARROW.
APPLICATION FILED JUNE 28, 1916.
1,218,338.
Patented Mar. 6, 1917.
2 SHEETS—SHEET 2.
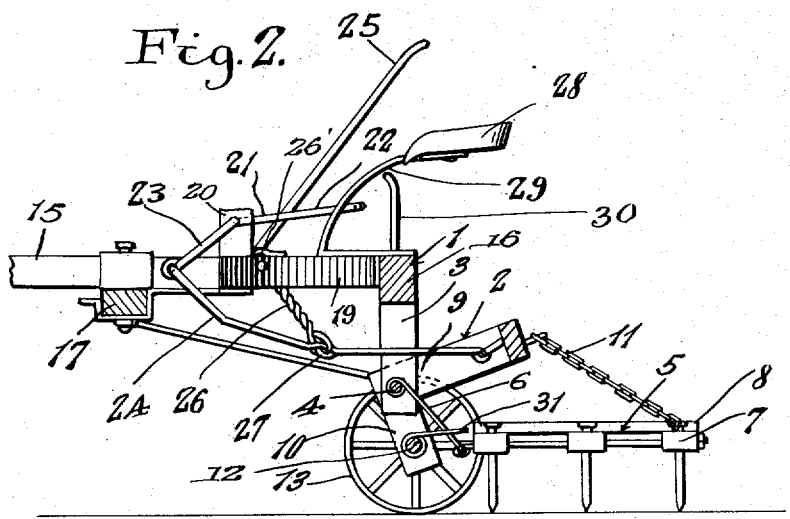
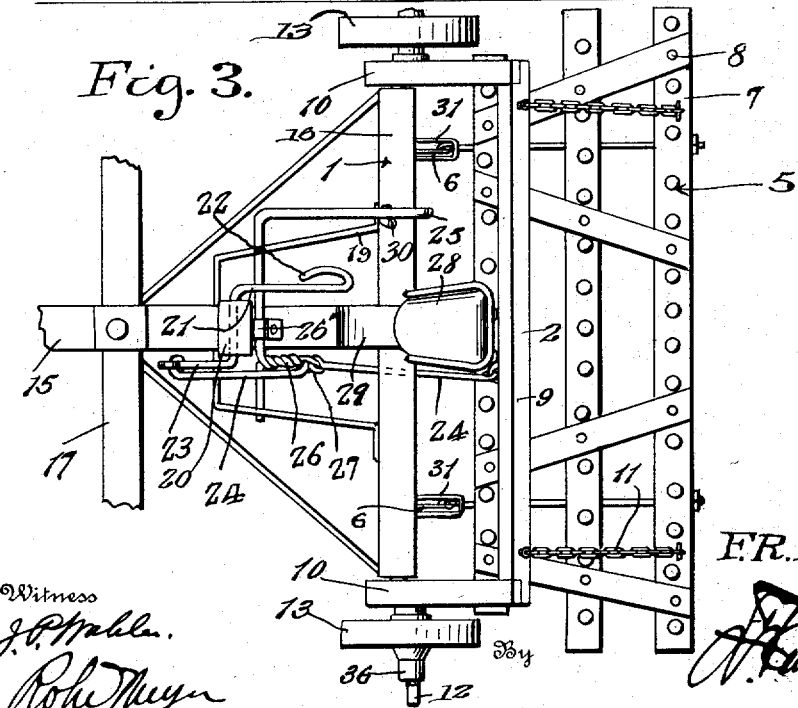

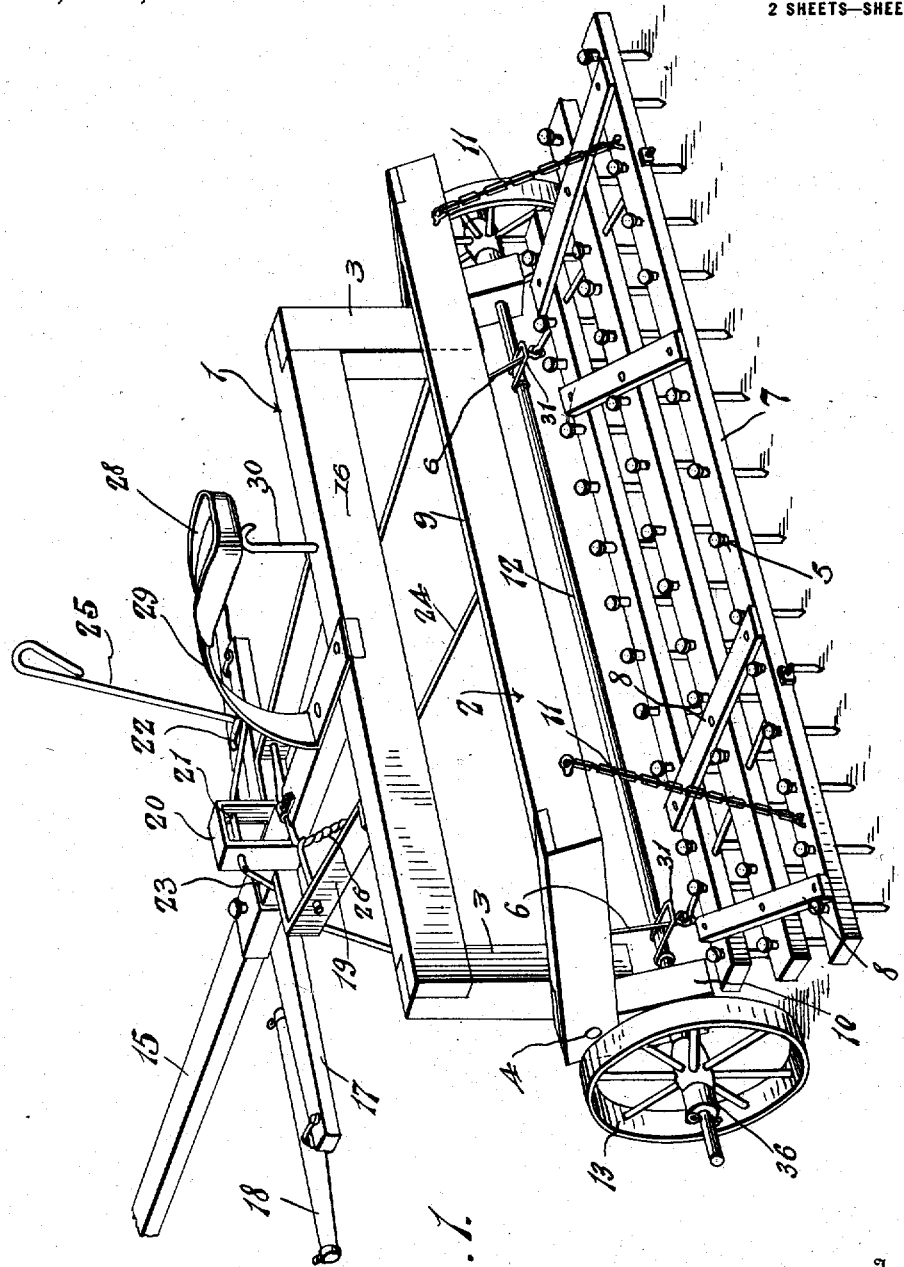

UNITED STATES PATENT OFFICE.

FREDERICK R. TENGLER, OF SCHULENBURG, TEXAS.

HARROW.

1,218,338.	Specification of Letters Patent.	Patented Mar. 6, 1917.

Application filed June 28, 1916. Serial No. 106,415.

*To all whom it may concern:*

Be it known that I, FREDERICK R. TENG-LER, a citizen of the United States, residing at Schulenburg, in the county of Fayette and State of Texas, have invented certain new and useful Improvements in Harrows; and I do hereby declare the following to be a full, clear, and exact description of the invention, such as will enable others skilled in the art to which it appertains to make and use the same.

This invention relates to harrows, and the primary object of the invention is to provide a wheeled riding harrow which is constructed so that the harrow proper may be moved into and out of a land engaging position as desired.

A further object of this invention is to provide a harrow structure as specified which includes a substantially U-shaped supporting frame having an auxiliary frame pivotally connected thereto which auxiliary frame is provided with downwardly extending arms and a rearwardly extending portion which is connected to a harrow structure by means of flexible members, and further to pivotally connect the harrow structure to the rod which pivotally connects the auxiliary frame to the U-shaped frame, and rotatably support an axle by the the depending arms of the auxiliary frame.

A further object of this invention is to provide a hand lever and foot trip construction for pivotally moving the rearwardly extending portion of the auxiliary frame into engagement with the rear surface of the upper cross bar of the U-shaped frame for elevating the harrow out of a land engaging position.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a perspective view of the improved harrow.

Fig. 2 is a cross sectional view through the harrow, and Fig. 3 is a top plan view of the harrow.

Referring more particularly to the drawings, 1 designates the substantially U-shaped frame of the harrow structure, which frame has an auxiliary frame 2 pivotally connected to the lower ends of the depending legs 3 thereof by means of a rod 4, which rod extends across the entire width of the harrow and has a harrow structure proper indicated by the numeral 5 pivotally connected thereto by means of rods 6. The harrow structure 5 is constructed in the ordinary manner including a plurality of harrow tooth carrying bars 7 and brace bars 8. The auxiliary frame 2 includes a rearwardly extending portion 9 and depending arms 10. The rearmost harrow tooth carrying bar 7 of the harrow structure 5 is connected to the rear portion of the rearwardly extending portion 9 of the frame 2 by means of chains or analogous flexible members as indicated at 11.

An axle 12 is rotatably supported by the depending arm 10 and it has supporting wheels 13 of the ordinary construction mounted thereon. A tongue 15 of the ordinary construction is connected to the upper bight portion 16 of the U-shaped frame 1 and it has a doubletree 17 of the usual construction connected thereto to which swingletrees 18 are connected in the usual manner for hitching draft animals to the harrow. A frame 19 is attached to the tongue 15 and the bight portion 16 and it has an upstanding portion 20 formed thereon through which a portion of a foot lever 21 extends. The foot lever 21 is crank shaped, and includes a foot trip 22 and a depending arm 23 the lower end of which is connected to the rod 24 which rod extends rearwardly and is connected to the auxiliary pivoted frame 2. A hand lever 25 is pivotally mounted as shown at 26' upon the tongue 15 and it has a depending portion 26 formed thereon, which depending portion is connected to the rod 24 as shown at 27 so that the frame 2 may be pivotally moved by either the foot trip or lever 22 or the hand lever 25, depending upon the desires of the operator of the machine. The foot trip 21 and the hand lever 25 are positioned in close proximity to a seat 28 of the ordinary construction used on agricultural implements, which seat is supported by the usual type of spring standard 29.

An upstanding hook 30 is carried by the frame 1 and it is provided for engagement with the hand lever 25 for holding the lever in a depressed position, which will hold the upper or cross portion of the rearwardly extending portion 9 of the frame 2 against the rear surface of the bight portion 16 of the frame 1 and consequently hold the harrow structure in upward and non-land engaging positions.

Loops 31 are attached to the axle 12 and extend about the rods 6.

When it is desired to transport the harrow along a highway, the hand lever 25 is depressed and positioned beneath the hook portion of the hook 30 which will hold the harrow structure 5 in an inoperative position, and also hold the portion 9 of the auxiliary frame 2 upwardly against the frame 1. When it is desired to use the harrow for pulverizing ground, the hand lever is disconnected from the hook 30 and allowed to move upwardly which permits the harrow 5 to move into a land engaging position as clearly shown in Fig. 2 of the drawings, at which time the portion 9 of the frame 2 will move downwardly away from the frame 1.

The supporting wheels 13 are preferably slidably mounted upon the axle 12 and held in place by means of collars 36, so that the tread of the harrow may be varied if desired.

From the foregoing description taken in connection with the accompanying drawings, the advantages of construction and of the method of operation of the improved harrow will be readily apparent to those skilled in the art to which this invention appertains, and while in the foregoing description the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a harrow structure, a substantially U-shaped supporting frame, an auxiliary frame pivotally connected to said supporting frame, depending arms formed upon said auxiliary frame, an axle carried by said depending arms, supporting wheels mounted upon said axle, a rod for pivotally connecting said auxiliary frame to said U-shaped frame, a harrow structure including a plurality of harrow teeth carrying bars, said harrow structure being pivotally connected to said rod and means for pivotally moving said auxiliary frame for raising said harrow structure into or out of a land engaging position.

2. In a harrow structure, a substantially U-shaped supporting frame, an auxiliary frame pivotally connected to said supporting frame by means of a rod, depending arms formed upon said auxiliary frame, an axle carried by said depending arms, supporting wheels mounted upon said axle, a harrow structure including a plurality of harrow teeth carrying bars, rods connecting said harrow structure to said first named rod, flexible members connected to said auxiliary frame and said harrow structure for moving the harrow structure in unison with movement of the auxiliary frame.

3. In a harrow structure, a substantially U-shaped supporting frame, an auxiliary frame pivotally connected to said supporting frame by means of a rod, depending arms formed upon said auxiliary frame, an axle carried by said depending arms, supporting wheels mounted upon said axle, a harrow structure including a plurality of harrow teeth carrying bars, rods connecting said harrow structure to said first named rod, flexible members connected to said auxiliary frame and said harrow structure for moving the harrow structure in unison with movement of the auxiliary frame, a hand lever pivotally carried by said U-shaped supporting frame, rods connected to said hand lever and to said pivoted auxiliary frame for moving the auxiliary frame in an upward position for moving said harrow out of a land engaging position.

4. In a harrow structure, a substantially U-shaped supporting frame, an auxiliary frame pivotally connected to said supporting frame by means of a rod, depending arms formed upon said auxiliary frame, an axle carried by said depending arms, supporting wheels mounted upon said axle, a harrow structure including a plurality of harrow teeth carrying bars, rods connecting said harrow structure to said first named rod, flexible members connected to said auxiliary frame and said harrow structure for moving the harrow structure in unison with movement of the auxiliary frame, a hand lever pivotally carried by said U-shaped supporting frame, rods connected to said hand lever and to said pivoted auxiliary frame for moving the auxiliary frame in an upward position for moving said harrow out of a land engaging position, a foot lever pivotally carried by said supporting frame, said foot lever being connected to the rod which is connected to said hand lever and said pivoted frame, and means carried by said U-shaped frame for holding said foot lever in a depressed position for holding said harrow structure out of a land engaging position.

In testimony whereof I affix my signature in presence of two witnesses.

FREDERICK R. TENGLER.

Witnesses:
CHAS. BOEHM,
M. VANICEK.

Copies of this patent may be obtained for five cents each, by addressing the "Commissioner of Patents, Washington, D. C."